United States Patent [19]

Stark

[11] 4,223,742
[45] Sep. 23, 1980

[54] RESILIENT ARRANGEMENT IN A RING ROLLER ALLOWING RINGS TO ADAPT TO GROUND IRREGULARITIES

[76] Inventor: Karl G. C. Stark, Väderstad Herrgard, S-59021 Väderstad, Sweden

[21] Appl. No.: 890,196

[22] Filed: Mar. 24, 1978

[30] Foreign Application Priority Data

Apr. 14, 1977 [SE] Sweden .............................. 7704263

[51] Int. Cl.³ ..................... A01B 29/04; A01B 73/00
[52] U.S. Cl. .................................. 172/456; 172/497; 172/537; 172/572; 267/153
[58] Field of Search ................ 172/96, 142, 311, 456, 172/462, 497, 500, 537, 551, 570, 571, 572, 573, 619, 624, 643, 657, 705, 711; 267/21 R, 21 A, 57.1 R, 57.1 A, 63 A, 153; 280/671, 687, 716, 717

[56] References Cited

U.S. PATENT DOCUMENTS

| | | | |
|---|---|---|---|
| 1,302,146 | 4/1919 | Fetzer | 172/537 |
| 1,331,722 | 2/1920 | Remy | 172/537 |
| 2,660,817 | 12/1953 | Thomas | 172/705 |
| 2,706,113 | 4/1955 | Hickman | 267/21 |
| 2,796,712 | 6/1957 | Miller et al. | 172/572 |
| 3,601,424 | 8/1971 | Badland | 267/21 X |
| 3,632,128 | 1/1972 | Raidel | 280/687 |
| 3,640,348 | 2/1972 | Womble | 172/573 |
| 3,971,446 | 7/1976 | Nienberg | 172/311 |

FOREIGN PATENT DOCUMENTS

| | | | |
|---|---|---|---|
| 1321576 | 2/1963 | France | 172/662 |
| 423330 | 4/1967 | Switzerland | 172/142 |
| 423367 | 4/1967 | Switzerland | 267/158 |
| 714984 | 9/1954 | United Kingdom | 267/21 R |

OTHER PUBLICATIONS

"Mississippi Mulcher-Model PMR III", Poplarville Manufacturing Co., Poplarville, Miss., Jul. 1976.

*Primary Examiner*—Richard T. Stouffer
*Attorney, Agent, or Firm*—Blanchard, Flynn, Thiel, Boutell & Tanis

[57] ABSTRACT

In cultivating or rolling soil by rollers with several hinged interconnected frame sections, each having a set of rolls on a common shaft, rotatably journalled at the ends of downwardly dependent arms the rolls closest to a hinge will not roll the soil at all or too loosely in case of irregular or uneven ground.

To avoid this inconvenience the arms are pivotably and preferably also resiliently mounted on the frame in addition to which the arms are slightly rotatable or twistable about its longitudinal axis to allow a deviation from horizontal of the shaft which thus may follow the irregularities of the ground so that the roller rolls the soil very efficiently.

4 Claims, 3 Drawing Figures

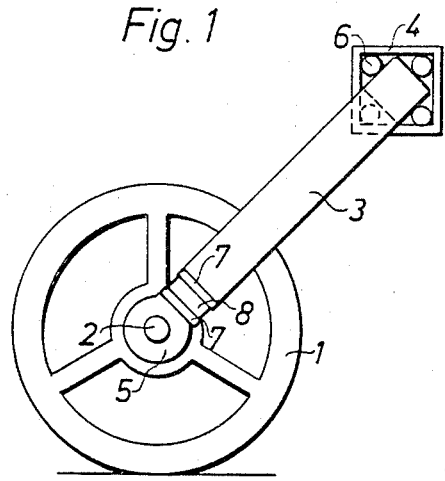
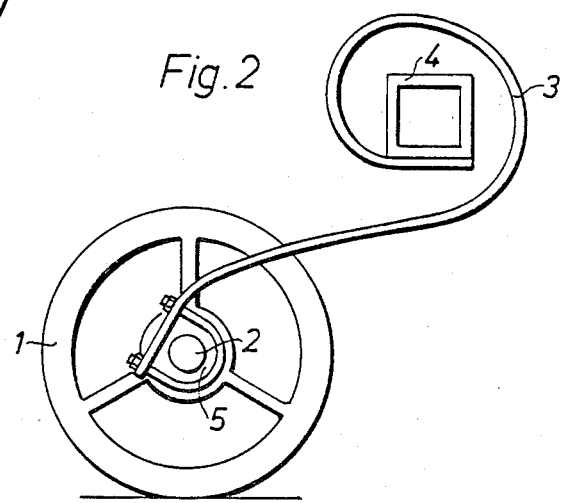
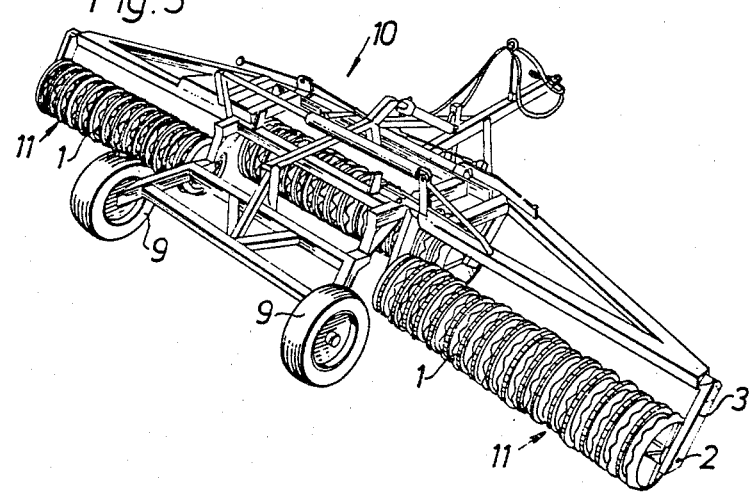

RESILIENT ARRANGEMENT IN A RING ROLLER ALLOWING RINGS TO ADAPT TO GROUND IRREGULARITIES

The present invention relates to an arrangement in ring rollers for towing by a tractor, said rollers containing a middle section and at least two outboard sections on either side of the middle section, the outboard sections being hinged to the middle section so that they may be folded upwards to a mainly vertical position. The middle section is provided with at least one transport wheel, arranged for engagement with the substructure when the roller is transported, e.g. on a road. The rolls of a section are arranged on a common shaft, the two ends of which are each rotatably journalled at the outer end of a downwardly dependent arm, the inner or upper end of said arm being connected to a structure included in each section, said structure generally being made as a lattice frame.

The frame and arms of a section are attached to its adjacent section or sections by hinges between the frames, which thus may form an angled interrelationship. It has proved difficult to get the rolls, closest to a hinge, to follow the irregularities of uneven ground. Thus, some parts of the soil will not be rolled or they will be rolled too loosely.

The object of this invention is therefore to provide an arrangement in such rollers that will remove this inconvenience, whereby the shaft carrying the rolls of a section is connected to the frame thereof in such a way that the shaft has a limited movement in relation to the frame with respect to a vertical plane perpendicular to the direction of travel, for the purpose of allowing the shaft with the rolls to adapt itself to the irregularities of the ground irrespective of the angular relationship of the interconnected frames.

In a preferred embodiment of the invention, at least one of the two arms carrying the shaft is resiliently and pivotably connected to the frame.

In another embodiment of the invention, the arm is formed with a low torsional resistance or is made in the form of a leaf spring.

In a further embodiment of the invention the frame is made from a single tube, preferably of quadratic cross section, to the ends of which the arms are attached by means of rubber elements.

The invention will hereinafter be more fully described while referring to the accompanying drawings, in which FIG. 1 is an end view of a roller according to the invention, showing frame, arm and shaft with rolls, FIG. 2 is an end view of another embodiment of a roller according to the invention, wherein the arm is made of a leaf spring, and FIG. 3 is a perspective view of a roller.

The roller, intended to be coupled to a prime mover, e.g. a tractor, contains a middle section 10 and outboard sections 11 on either side, that may be swung upwards for transport. For transport, the middle section 10 is provided with at least one carrying wheel 9 that may be lowered by a hydraulic cylinder controlled from the tractor, for keeping the roller raised above the substructure.

The middle section 10, as well as the outboard sections 11 are provided with a plurality of closely spaced metal rolls 1, preferably cast iron, arranged on and perpendicular to a common shaft 2 the ends of which are rotatably journalled in bearings 5 at the free ends of arms 3, so that the shafts are substantially horizontal when in operation. The arms 3 are attached to the frame 4 at their upper ends and are angularly dependent to the frame 4.

In FIG. 1, the arm 3 has the form of a rigid member. To make it possible for the shaft 2 to move in different angular directions with respect to the frame 4, the arms 3 may be rigid but mounted resiliently pivotable on the frame member 4 about the longitudinal axis of the frame member by means of rubber elements 6. Since the resilience is provided by rubber elements 6, it is also possible for the arm 3 to turn a small amount about its longitudinal axis. The arm 3 may also be pivotably mounted on the frame member 4 and be slightly rotatable about its longitudinal axis, by means of a rubber cushion 8 vulcanized to two steel plate 7. The leaf spring arm 3' shown in FIG. 2, also works on the torsional principle, which is a distinguishing feature of the invention, but in this case the more "linear" portion of the spring arm 3' twists, to absorb the torsional deflection caused by the angular deviation from horizontal of the shaft 2.

The invention is not limited to the embodiments described and illustrated on the drawings but other embodiments may also be conceived within the scope of the invention.

I claim:

1. An arrangement in a ring roller intended to be towed by a tractor and including
   hingeable outboard sections which can be folded upward, and
   a middle section provided with at least one wheel arranged to be let down to keep the roller lifted when the roller is towed on a substructure, a frame included with each of said sections,
   rings being included in said middle section and each said outboard section, said rings being arranged on each section on at least one common shaft pertaining to the respective section,
   elongated swinging arms being provided, the ends of each said shaft being rotatably mounted in bearings at the lower free ends of respective ones of said arms, which said arms are mounted on and extend at an angle downward from the frame of each said section,
   the shaft carrying the rings of a specific said section being connected to the frame of said section by said arms, said arms having means allowing the shaft and frame to each have mutual angular displacement relative to the longitudinal axis of each of said arms, in which said angular displacement allowing means includes a first resilient means allowing the arms carrying the shaft of said specific section to undergo a resiliently limited pivoting movement with respect to said frame along an axis lying in a forward facing vertical plane intersected by said arms, and a second resilient means spaced from said first resilient means and allowing each said arm to twist about its longitudinal axis in response to angular displacement of the arm relative to its longitudinal axis caused by the shaft tilting from the horizontal
   and thereby allowing the shaft with its rings to adapt itself to the irregularities of the ground irrespective of the relative angular relationship of the interconnected frames.

2. An arrangement according to claim 1, in which said second resilient means of the arm includes upper and lower stiff arm end portions joined by a rubber element vulcanized between two steel plates each of which being attached to a said end portion of the arm.

3. An arrangement in a ring roller intended to be towed by a tractor and including hingeable outboard sections which can be folded upward, and a middle section provided with at least one wheel arranged to be let down to keep the roller lifted when the roller is towed on a substructure, a frame included with each of said sections, rings being included in said middle section and each said outboard section, said rings being arranged on each section on at least one common shaft pertaining to the respective section, elongated swinging arms being provided, the ends of each said shaft being rotatably mounted in bearings at the lower free ends of respective ones of said arms, which said arms are mounted on and extend at an angle downward from the frame of each said section, the shaft carrying the rings of a specific said section being connected to the frame of said section by said arms, said arms having means allowing the shaft and frame to each have mutual angular displacement relative to the longitudinal axis of each of said arms, in which the frame of a section is formed by a single straight tubular beam and the arm is formed by a stiff member, said allowing means including a first resilient means comprising rubber elements pivotably and resiliently mounting the arm upper end on the tubular beam for enabling resiliently limited pivoting of said arm about the length axis of the beam, and providing resiliency in the mounting for enabling the arm to turn slightly about its longitudinal axis, said allowing means further including a second resilient means spaced from said first resilient means and allowing each said arm to twist about its longitudinal axis in response to angular displacement of the arm relative to its longitudinal axis caused by the shaft tilting from the horizontal, and thereby allowing the shaft with its rings to adapt itself to the irregularities of the ground irrespective of the relative angular relationship of the interconnected frames.

4. An arrangement in a ring roller intended to be towed by a tractor and including hingeable outboard sections which can be folded upward, and a middle section provided with at least one wheel arranged to be let down to keep the roller lifted when the roller is towed on a substructure, a frame included with each of said sections, rings being included in said middle section and each said outboard section, said rings being arranged on each section on at least one common shaft pertaining to the respective section, elongated swinging arms being provided, the ends of each said shaft being rotatably mounted in bearings at the lower free ends of respective ones of said arms, which said arms are mounted on and extend at an angle downward from the frame of each said section, the shaft carrying the rings of a specific said section being connected to the frame of said section by said arms, said arms having means allowing the shaft and frame to each have mutual angular displacement relative to the longitudinal axis of each of said arms, said arms being formed by elongated rigid members, said angular displacement allowing means including a first elastomeric structure resiliently connecting the upper end of each said arm to said frame for resiliently limited pivoting of the arms on the frame about an axis substantially perpendicular to the longitudinal direction of said arms, said angular displacement allowing means further including a second elastomeric structure providing the connection between the upper and lower end portions of each said arm for resiliently limited twisting of said arm to permit limited angular displacement between said shaft and frame about the longitudinal axis of said arm, and thereby allowing the shaft with its rings to adapt itself to the irregularities of the ground irrespective of the relative angular relationship of the interconnected frames.

* * * * *